US012737972B2

(12) United States Patent
Kiyomiya

(10) Patent No.: US 12,737,972 B2
(45) Date of Patent: Sep. 15, 2026

(54) IMAGE PROCESSING METHOD, INFORMATION PROCESSING APPARATUS, AND NON-TRANSITORY COMPUTER READABLE MEDIUM

(71) Applicant: BANDAI CO., LTD., Tokyo (JP)

(72) Inventor: Ryota Kiyomiya, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 305 days.

(21) Appl. No.: 18/509,994

(22) Filed: Nov. 15, 2023

(65) Prior Publication Data

US 2024/0177416 A1 May 30, 2024

(30) Foreign Application Priority Data

Nov. 29, 2022 (JP) ................................ 2022-190546

(51) Int. Cl.
*G06T 17/00* (2006.01)

(52) U.S. Cl.
CPC .... *G06T 17/00* (2013.01); *G06T 2207/10028* (2013.01)

(58) Field of Classification Search
CPC ...................... G06T 17/00; G06T 2207/10028
See application file for complete search history.

(56) References Cited

U.S. PATENT DOCUMENTS

2009/0109219 A1* 4/2009 DeCoro ................ G06T 17/205 345/423
2019/0347865 A1* 11/2019 Hackett .................. G06T 13/20
2020/0027268 A1* 1/2020 Kawamata .............. G06T 17/20
2020/0349301 A1* 11/2020 Ashdown ................ G06F 30/27
2021/0118237 A1* 4/2021 Hou ..................... G06V 10/751
2021/0248831 A1* 8/2021 Tate-Gans ............. G06T 19/006
2021/0390785 A1* 12/2021 Driancourt ............. G06V 10/40

FOREIGN PATENT DOCUMENTS

JP 2020-107251 A 7/2020
JP 2021-051537 A 4/2021

* cited by examiner

*Primary Examiner* — Abderrahim Merouan
(74) *Attorney, Agent, or Firm* — Rabin & Berdo, P.C.

(57) ABSTRACT

An image processing method for generating display data for displaying a virtual reality (VR) video on an external display device includes: generating, using a processor, first three-dimensional model data of a model from a plurality of scanned images generated by scanning an exterior of the model from a plurality of directions using a scanner, processing the first three-dimensional model data using the processor, adding an effect to the processed first three-dimensional model data using the processor, and generating display data including the first three-dimensional model data to which the effect is added.

12 Claims, 9 Drawing Sheets

IMAGE PROCESSING METHOD, INFORMATION PROCESSING APPARATUS, AND NON-TRANSITORY COMPUTER READABLE MEDIUM

CROSS REFERENCES TO RELATED APPLICATIONS

The present invention contains subject matter related to Japanese Patent Application No. 2022-190546 filed in the Japan Patent Office on Nov. 29, 2022, the entire contents of which are incorporated herein by reference.

BACKGROUND OF THE INVENTION

1. Field of the Invention

The present invention relates to an image processing method, an information processing apparatus, and a non-transitory computer readable medium.

2. Description of the Related Art

Japanese Unexamined Patent Application Publication No. 2020-107251 describes a technology for generating a virtual space image visible from a virtual camera in a virtual space by mapping, onto primitives in the virtual space, textures generated from a group of captured images of a target object captured from a plurality of image capturing directions by an image capturing unit.

Japanese Unexamined Patent Application Publication No. 2021-051537 describes a technology for generating three-dimensional model data using image data of photos of a diorama taken from a plurality of positions, and using the data to represent scenes in a computer game.

In the above technologies, when images of a target object are captured and three-dimensional model data of the target object subjected to image capturing is used to generate a video in which the three-dimensional model is arranged in a virtual space, it is desired to generate a video full of a sense of realism.

SUMMARY OF THE INVENTION

Accordingly, it is an object of the present invention to enable generation of a video full of a sense of realism when images of a target object are captured and three-dimensional model data of the target object subjected to image capturing is used to generate a video in which the three-dimensional model is arranged in a virtual space.

One form to solve the above-described issue is an image processing method for generating display data for displaying a virtual reality (VR) video on an external display device. The image processing method includes: generating, using a processing unit, first three-dimensional model data of a model from a plurality of scanned images generated by scanning an exterior of the model from a plurality of directions using a scanner unit, processing the first three-dimensional model data using the processing unit, adding an effect to the processed first three-dimensional model data using the processing unit, and generating display data including the first three-dimensional model data to which the effect is added.

When images of a target object are captured and three-dimensional model data of the target object subjected to image capturing is used to generate a video in which the three-dimensional model is arranged in a virtual space, it is possible to generate a video full of a sense of realism.

DESCRIPTION OF THE PREFERRED EMBODIMENTS

In the following, embodiments will be described in detail with reference to the attached drawings. Note that the following embodiments are not intended to limit the inventions according to the claims, and not all combinations of features described in the embodiments are essential to the inventions. Any two or more of the features described in the embodiments may be combined. The same reference numbers are used for identical or similar configurations, and redundant description is omitted. In each diagram, the top, bottom, left, right, front, and back directions with respect to the surface of the paper sheet will be used as the top, bottom, left, right, front, and back directions of components (or parts) in the present embodiment in the description provided herein.

Figure 1A:
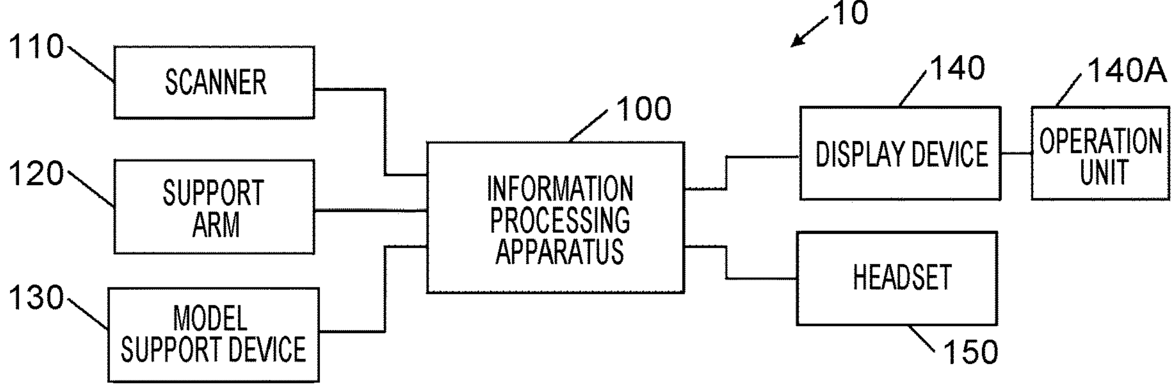
FIGS. 1A, 1B, and 1C are a diagram illustrating an example of the configuration of an image processing system corresponding to an embodiment, a diagram illustrating an example of a hardware configuration of an information processing apparatus, and a diagram illustrating an example of a hardware configuration of a headset.

First, the configuration of an image processing system corresponding to the present embodiment will be described. FIG. 1A is a diagram illustrating an example of the configuration of an image processing system 10 corresponding to the present embodiment. The image processing system 10 has a configuration in which, for example, a scanner 110, a support arm 120, a model support device 130, a display device 140, and a headset 150 are connected to an information processing apparatus 100. Note that the system configuration is not limited to that illustrated in FIG. 1A, and the information processing apparatus 100 may further be connected to an external server, a cloud server, or the like via a network. The external server and the like can execute at least part of processing performed in the embodiments described below.

The information processing apparatus 100 controls the operation of at least one of the scanner 110, the support arm 120, and the model support device 130, captures and generates a plurality of images of an image capturing target item from freely chosen angles, and generates three-dimensional model data (original data) from the plurality of images. In a case where the image capturing target item can be separated into a plurality of constituent items, three-dimensional model data for each constituent item may be generated by capturing images of the constituent item, and three-dimensional model data for the target item may be generated by combining the three-dimensional model data for the plurality of constituent items.

By using the generated three-dimensional model data as data for a virtual space, the information processing apparatus 100 can also function as an image processing apparatus that generates an image displayed in the virtual space. Moreover, an image processing apparatus that uses the three-dimensional model data may be prepared separately from the information processing apparatus 100, which generates the three-dimensional model data. In the present embodiment, examples of the image capturing target item include an assemblable plastic model, an action figure (a figure with movable joints), a toy object, and a doll. These are collectively called "models" below.

Next, the scanner 110 is a three-dimensional scanner device that captures images of (scans) a three-dimensional shape of a model, an image capturing target, under control performed by the information processing apparatus 100 to output the three-dimensional shape of and color information on the image capturing target. In the present embodiment, scan signals output from the scanner 110 are collectively called "scan images". As the scanner 110, for example, Space Spider manufactured by Artec 3D can be used. In the present embodiment, 3D scan data of the entire toy object can be acquired by acquiring 500 to 800 frames of scanned images, for example. Moreover, as the scanner 110, a camera-equipped smartphone in which an application for capturing images of three-dimensional shapes is installed may be used, for example.

The support arm 120 is a position-orientation controller that moves the scanner 110 to a predetermined image capturing position and causes the scanner 110 to be in a certain orientation under control performed by the information processing apparatus 100. The support arm 120 may be configured to be capable of manually changing the image capturing position and orientation of the scanner 110 and also capable of maintaining, in a fixed manner, the position and orientation after the change. Alternatively, the support arm 120 may be configured to be controllable by the information processing apparatus 100. In a case where the support arm 120 is configured to be controllable by the information processing apparatus 100, for example, xArm 7 manufactured by UFACTORY can be used. xArm 7 includes seven joints and is capable of performing movements similar to those of a human arm. Note that the position of the scanner 110 may be manually determined instead of using the support arm 120. Moreover, the scanner 110 may be manually operated to perform scanning at certain image capturing positions and in certain orientations that cannot be achieved by the support arm 120.

The model support device 130 is a support base that supports a model in a fixed pose. The model support device 130 may be configured to be rotatable in a state where, for example, a model is arranged on the support base or is arranged at the end of a support rod. In the present embodiment, the support arm 120 is used to position the scanner 110 at a certain image capturing position and a certain image capturing angle, and thereafter image capturing is performed while rotating the model support device 130 in a full circle. This is performed at a plurality of image capturing positions and a plurality of image capturing angles, so that images of the entire model can be acquired. Note that, in this case, image capturing processing can be more easily and more accurately performed by driving the support arm 120 and the model support device 130 in a synchronized manner. Moreover, the scanner 110 may be manually moved around the model instead of using the model support device 130 and may perform scanning from any image capturing position and any image capturing angle.

The display device 140 is a display device, such as a liquid crystal display (LCD), and can display processing results from the information processing apparatus 100. Specifically, the display device 140 can display images captured by the scanner 110, display the original data of three-dimensional model data generated from the captured images, and display a VR video reconstructed using the original data. The display device 140 may have an operation unit 140A, which accepts operations from the user. The user can change the display area of a video by operating the operation unit 140A or can perform a predetermined selection operation and so on.

The headset 150 includes a head-mounted display 150A and a controller 150B, which will be described below. In particular, as a VR headset, the headset 150 may be configured to be capable of supplying a video responsive to the user's posture and tilt. A predetermined application has been installed in the headset 150. The headset 150 can download application data from the information processing apparatus 100 and execute the application using the application data. The application data includes display data for displaying a VR video.

Figure 1B:
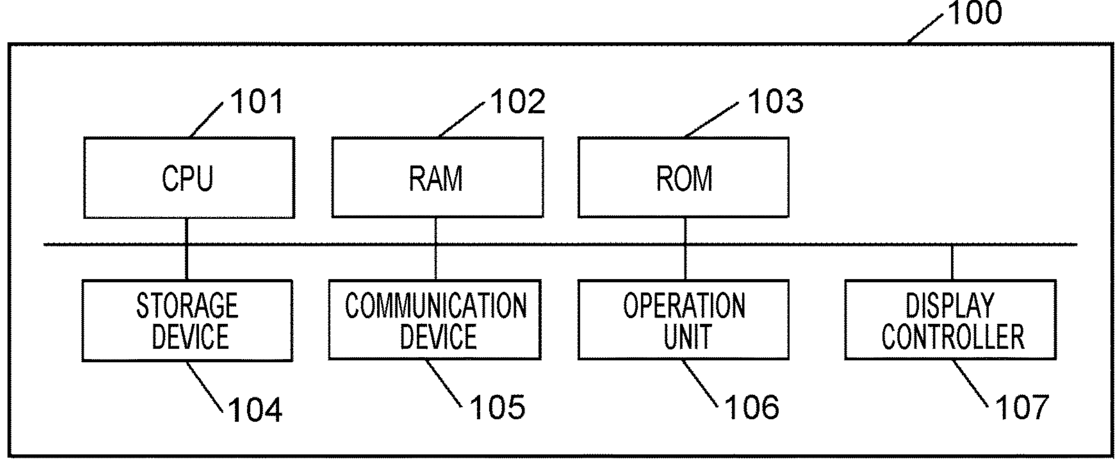

FIG. 1B illustrates an example of a hardware configuration of the information processing apparatus 100. A processor, i.e., a central processing unit (CPU) 101 is a device that controls the information processing apparatus 100 overall and calculates, processes, and manages data. For example, the CPU 101 can control image capturing timings of the scanner 110 and the number of images to be captured by the scanner 110 and also arrange the scanner 110 at any image capturing position and any image capturing angle by controlling the arm joints of the support arm 120. Moreover, after determining the image capturing position and image capturing angle of the scanner 110, an image capturing operation can be performed using the scanner 110 while rotating the model support device 130. Moreover, the CPU 101 may also function as an image processing unit that processes images output from the scanner 110.

A random-access memory (RAM) 102 is a volatile memory and is used as a temporary storage area, such as a main memory, a work area, and the like, of the CPU 101. A read-only memory (ROM) 103 is a non-volatile memory in which image data, other data, various programs for the CPU 101 to operate are stored in predetermined respective areas. The CPU 101 uses, in accordance with for example the programs stored in the ROM 103, the RAM 102 as a work memory to control various units of the information processing apparatus 100. Note that the programs for the CPU 101 to operate are not limited to those stored in the ROM 103 and may be stored in a storage device 104.

The storage device 104 includes a magnetic disk, such as a hard disk drive (HDD) or a flash memory. The storage device 104 stores application programs, an operating system (OS), control programs, related programs, game programs, and so forth. Data can be read out from and data can be written into the storage device 104 data under control performed by the CPU 101. The storage device 104 may be used instead of the RAM 102 or the ROM 103.

A communication device 105 is a communication interface for communicating with the scanner 110, the support arm 120, the model support device 130, the display device 140, and the headset 150 under control performed by the CPU 101. The communication device 105 may be configured to be capable of further communicating with an external server, for example. The communication device 105 may include a wireless communication module. The module can include known circuit mechanisms, which include, for example, an antenna system, a radio frequency (RF) transceiver, one or more amplifiers, a tuner, one or more oscillators, a digital signal processor, a CODEC chipset, a Subscriber Identification Module card, and a memory. In this case, wireless communication may be performed from the information processing apparatus 100 to the scanner 110, the support arm 120, the model support device 130, the display device 140, and the headset 150, and vice versa.

Moreover, the communication device 105 can also include a wired communication module for wired communication. The wired communication module enables communication with other devices including the display device 140 via one or more external ports. Moreover, the wired communication module can include various software components that process data. The external ports couple with other devices directly using, for example, Ethernet, USB, or IEEE 1394 or indirectly via a network. Note that software that realizes functions equivalent to the devices described above may be substituted for those hardware devices.

An operation unit 106 includes, for example, a button, a keyboard, and a touch panel, and accepts operation inputs from the user. The operation unit 106 may be shared with the operation unit 140A or may be independent of the operation unit 140A. For example, in a case where the operation unit 140A is assumed to be an operation unit constituted by, for example, a keyboard and a mouse, the operation unit 140A can be shared with the operation unit 106. In contrast, in a case where the operation unit 140A is assumed to be an operation unit constituted by, for example, a touch panel, the operation unit 140A can be separate from the operation unit 106.

A display controller 107 functions as a controller for displaying information on the display device 140 connected to the information processing apparatus 100, and controls the operation of the display device 140. The display device 140 may have some functions of the operation unit 106. For example, the display device 140 may be configured as a device with a touch panel such as a tablet terminal.

Figure 1C:
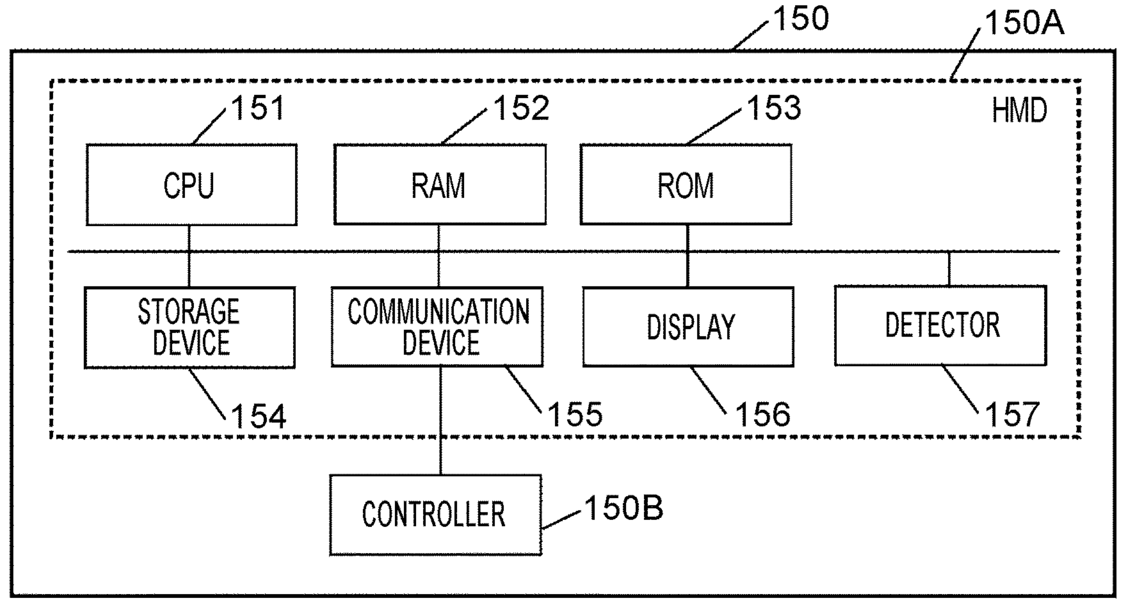

FIG. 1C illustrates an example of the hardware configuration of the headset 150. The headset 150 includes a head-mounted display (HMD) 150A and a controller 150B. The HMD 150A provides a right-eye video and a left-eye video to the user's left eye and right eye, respectively, enabling a virtual reality (VR) experience by allowing the user to feel a sense of depth through the parallax between the right-eye and left-eye videos. The controller 150B is provided in a casing independent of the HMD 150A. The controller 150B is assumed to have a configuration in which two controllers are paired with each other with the user holding and operating one in their left hand and the other in their right hand. However, the controller 150B may also be a single controller.

A CPU 151 is a device that controls the headset 150 overall and calculates, processes, and manages data. For example, by processing application data downloaded from the information processing apparatus 100, the CPU 151 can display a VR video on a display 156. Moreover, on the basis of an operation accepted through the controller 150B or information detected by a detector 157, the displayed VR video itself can be switched, the viewpoint can be switched within the VR space, and the position within the VR space can be changed.

A RAM 152 is a volatile memory and is used as a temporary storage area, such as a main memory, a work area, and the like, of the CPU 151. A ROM 153 is a non-volatile memory in which image data, other data, various programs for the CPU 151 to operate are stored in predetermined respective areas. The CPU 151 uses, in accordance with for example the programs stored in the ROM 153, the RAM 152 as a work memory to control various units of the headset 150. Note that the programs for the CPU 151 to operate are not limited to those stored in the ROM 153 and may be stored in a storage device 154.

The storage device 154 includes a magnetic disk, such as a hard disk drive (HDD) or a flash memory. The storage device 154 stores, for example, application programs, an OS, control programs, related programs, game programs, and application data and display data downloaded from the information processing apparatus 100. Data can be read out from and data can be written into the storage device 154 under control performed by the CPU 151. The storage device 154 may be used instead of the RAM 152 or the ROM 153.

A communication device 155 is a communication interface for communicating with the information processing apparatus 100 and the controller 150B under control performed by the CPU 151. The communication device 155 includes a wireless communication module that enables wireless communication based on Bluetooth or Wi-Fi (IEEE 802.11). The headset 150 is connected to the information processing apparatus 100 through wireless communication and can download display data for a VR video. Moreover, the headset 150 communicates with the controller 150B to receive information on an operation command made on the controller 150B by the user.

The display 156 is configured to provide a right-eye video and a left-eye video generated by the CPU 151 to the user's right eye and left eye, respectively. The detector 157 is a mechanism for detecting the direction of the line of sight of the user's left and right eyes as well as the tilt of the head-mounted display. The detector 157 includes, for example, a sensor for detecting the direction of the light of sight or the gazing direction of the user wearing the HMD 150A. The detector 157 also includes a gyroscope, a magnetometer, an accelerometer, a global positioning system (GPS), a compass, and so forth, and can identify the position, orientation, tilt, and the like of the HMD 150A in accordance with detected information from these devices. The detector 157 in the HMD 150A detects information for determining the gaze direction and action of the user and transmits the information to the CPU 151. The CPU 151 determines the gaze direction and action of the user on the basis of the received detection information, and adjusts the video displayed on the display 156 of the HMD 150A such that the video matches the determined gaze direction and action.

The controller 150B includes, for example, a plurality of buttons and a cross key and accepts operation inputs from the user. Examples of the operation inputs include selection operations and direction indication operations. The controller 150B is wirelessly connected to the HMD 150A via the communication device 155.

Figure 2:
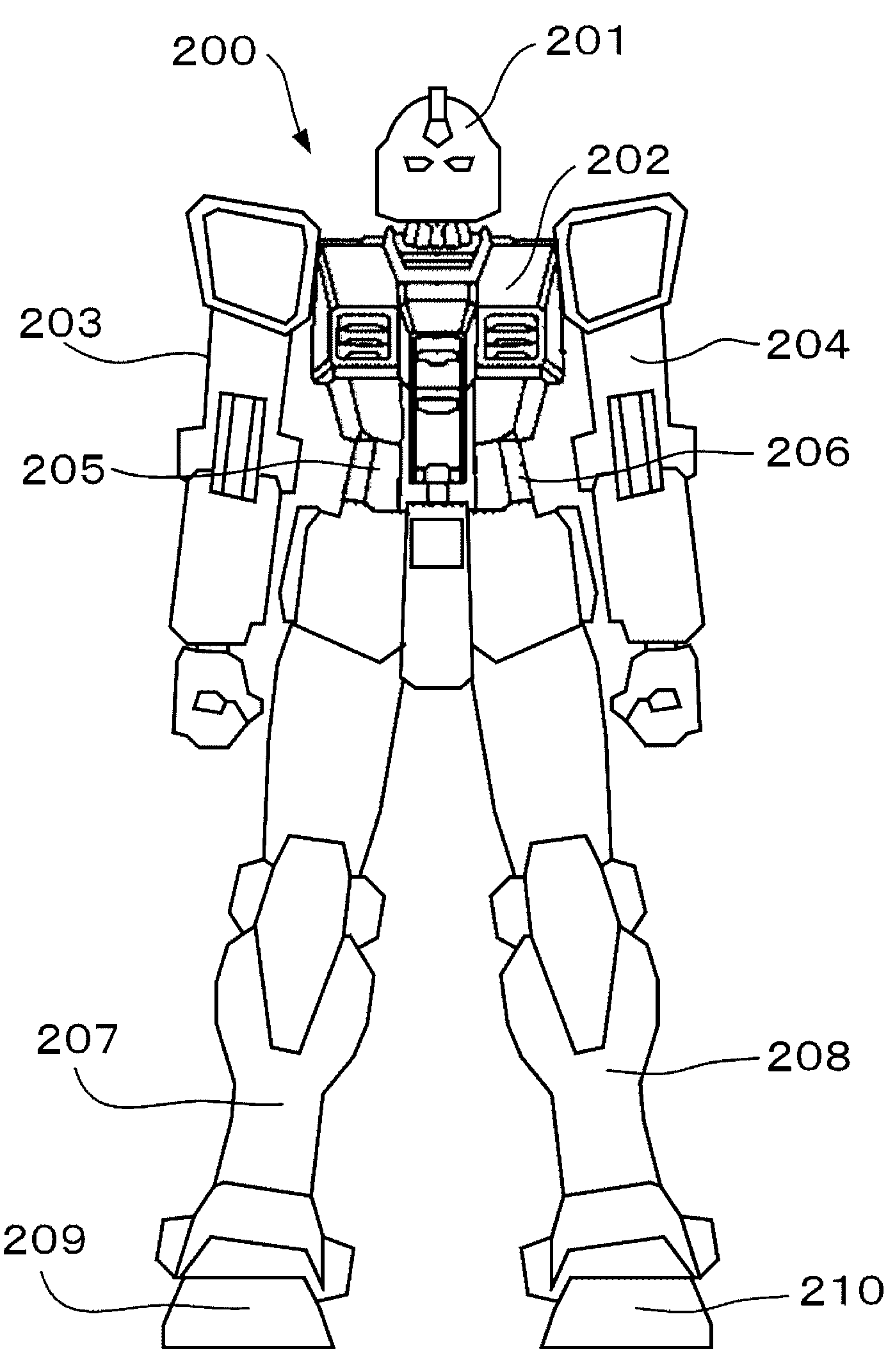
FIG. 2 is a diagram illustrating an example of the exterior of a humanoid model corresponding to the embodiment.

Next, an example of a model serving as an image capturing target in the present embodiment will be described with reference to FIG. 2. A model 200 is a model with a humanoid (robot or human) appearance. The model can be assembled and painted as a plastic model, for example. Alternatively, the model may be an assembled model, such as a figure with movable joints (an action figure). The model in FIG. 2 is merely an example for description, and the model does not necessarily have a humanoid appearance and can be of any shape. Examples of the model include general vehicles, racing vehicles, military vehicles, aircrafts, ships, animals, and virtual life forms. Note that items to be image capturing targets are, of course, not limited to models, as long as images of three-dimensional shapes of the items can be captured by the scanner 110.

The model 200 has the following parts: a head portion 201, a chest portion 202, a right arm portion 203, a left arm portion 204, a right torso portion 205, a left torso portion 206, a right leg portion 207, a left leg portion 208, a right foot portion 209, and a left foot portion 210, which are joined together. At least some of the individual portions 201 to 210 are supported in a pivotable (or rockable) manner with respect to adjacent portions. For example, the head portion 201 is pivotably supported with respect to the chest portion 202, and the right arm portion 203 and the left arm portion 204 are pivotably supported with respect to the chest portion 202. In this manner, each portion of the model 200 is provided with an articulated structure, and thus this allows the model 200 to assume any posture.

Figure 3:
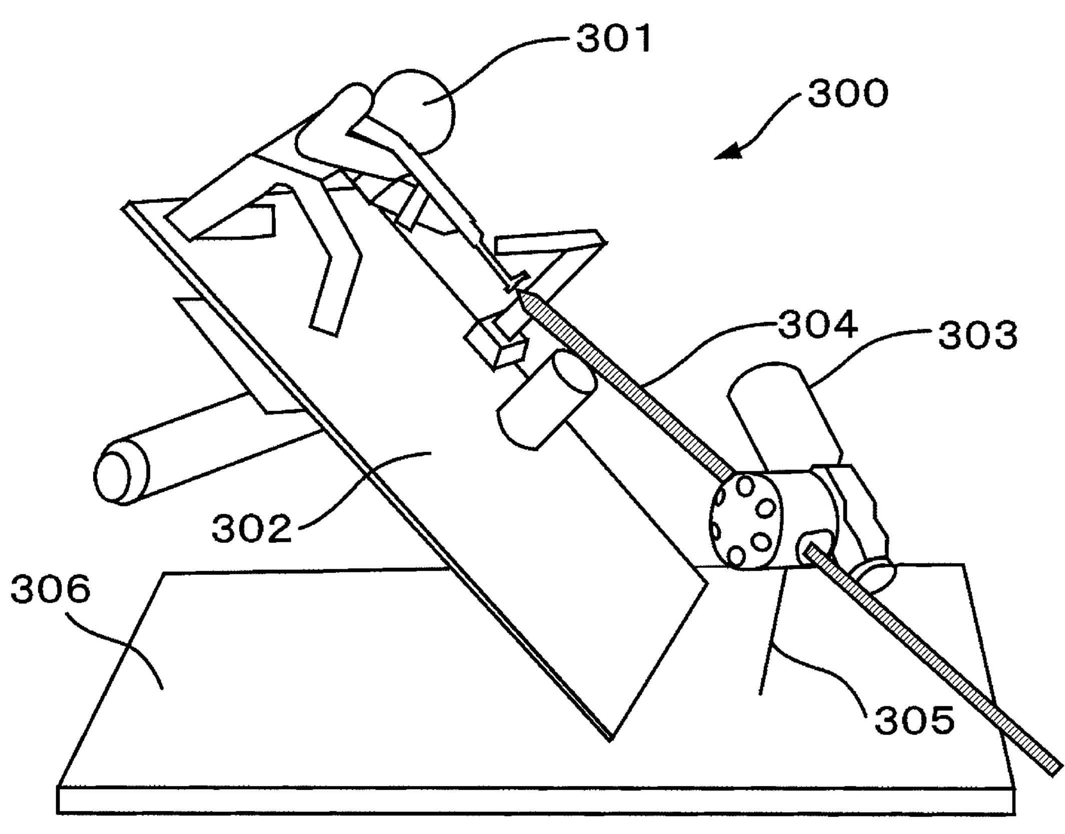
FIG. 3 is a diagram illustrating an example of the exterior of a diorama model corresponding to the embodiment.

An example of a diorama model serving as an image capturing target in the present embodiment will be described with reference to FIG. 3. A diorama model 300 illustrated in FIG. 3 represents a scene in which a humanoid model 301 is trying to strike down a floating part 303 with a beam 304 emitted from a beam rifle on a base member 302. The diorama model 300 can be separated into the humanoid model 301, the base member 302, and the floating part 303, which are constituent parts. The diorama model 300 is formed on a mount 306; however, the mount 306 itself is unnecessary for a VR video. Moreover, a support member 305 is arranged so as to keep the floating part 303 elevated; however, the support member 305 is also unnecessary for a VR video. When a VR video is generated, these are removed from three-dimensional model data.

The diorama model 300 is a model of a predetermined sight or scene, and the sight or scene may include the humanoid model 200 as illustrated in FIG. 2A. Unlike a single model such as the model 200, the diorama model 300 is a model to enjoy creating a sight that includes surroundings of the model 200. In the present embodiment, not only a single toy object such as the model 200 but also the diorama model 300 is generated as three-dimensional model data to provide a VR video. Consequently, the diorama model 300 can be viewed in a more realistic environment. Since diorama models can be created to imitate any sight or scene, the diorama model 300 illustrated in FIG. 3 is merely an example.

Figure 4:
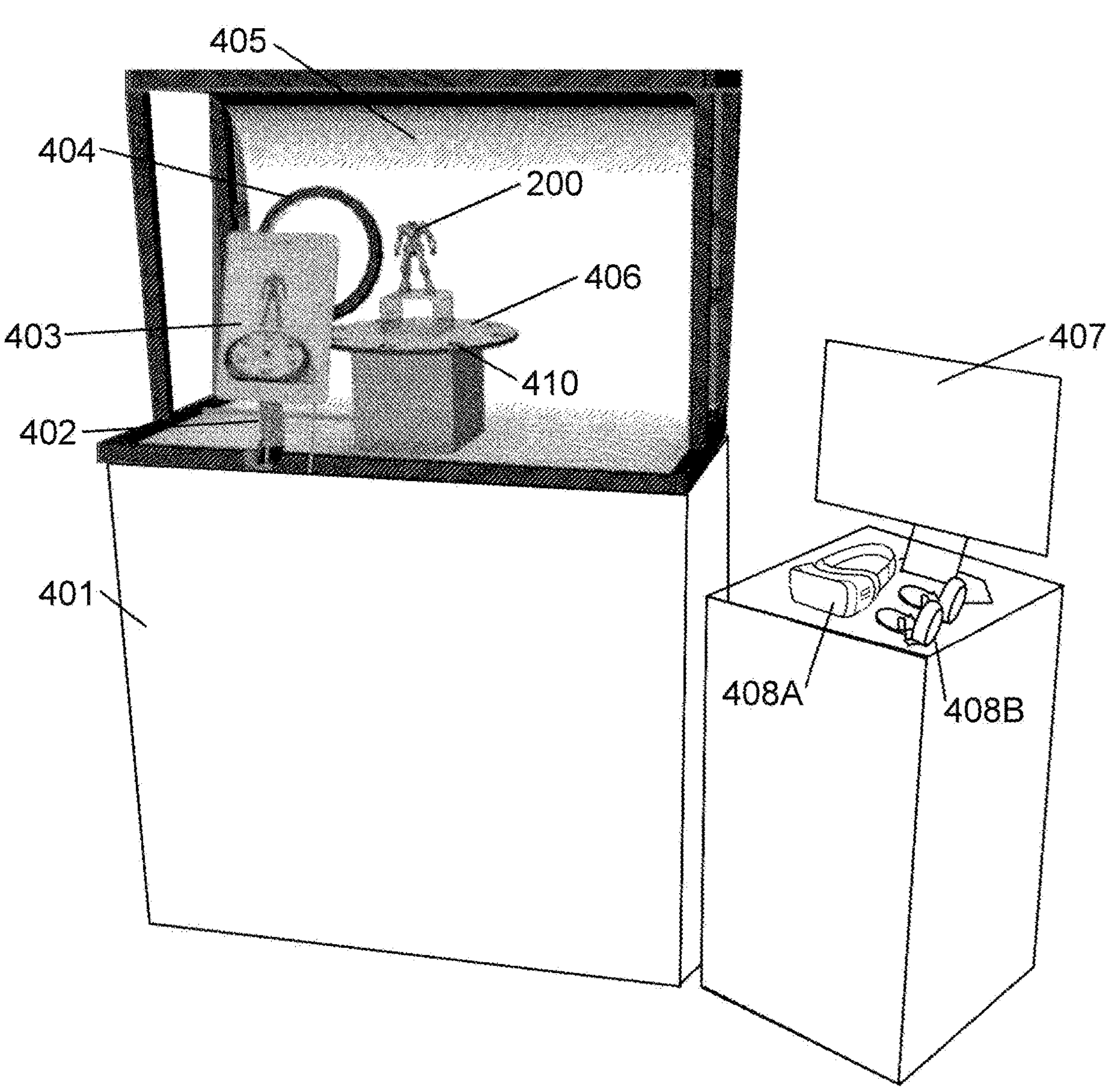
FIG. 4 is a diagram illustrating an example of an implementation of an image processing system corresponding to the embodiment.

Next, an implementation example of the image processing system 10 according to the present embodiment will be described with reference to FIG. 4. FIG. 4 illustrates an implementation example in which images of a model can be captured to generate original data.

In FIG. 4, a case 401 includes the information processing apparatus 100, a drive system for driving a support arm 402, and a drive system for driving a turntable 406. Note that the support arm 402 can manually adjust the image capturing direction and position. The surface of the case 401 is configured to be flat, so that a promotional poster can be attached thereon.

The support arm 402 corresponds to the support arm 120 and can support a terminal 403 functioning as the scanner 110 and fix the position of the terminal 403, under control performed by the information processing apparatus 100 or manually. The support arm 402 can also operate so as to control the tilt of the terminal 403.

The terminal 403 is a touch-screen terminal with a built-in camera, which can be used as the scanner 110. Examples of the terminal 403 include smartphones, tablet terminals, and digital cameras. Instead of these terminals, Space Spider manufactured by Artec 3D can be used. FIG. 4 is a diagram merely illustrating an example of the configuration of the system, and the system can have a configuration corresponding to the type of device to be used as the scanner 110. The terminal 403 can capture images of the model 200 and transmit the images to the information processing apparatus 100. A ring light 404 is a lighting device used when the terminal 403 captures images of the model 200. The ring light 404 can illuminate the model 200 evenly, and this can make shadows less likely to appear. Note that, in addition to the ring light 404, additional light sources may be installed, such as a top light and left, right, and bottom auxiliary lights. Instead of the terminal 403, a three-dimensional scanner device as described above may be used.

A background sheet 405 is a background sheet for image capturing, and a white sheet, for example, can be used as the background sheet 405. The turntable 406 can rotate with the model 200 mounted thereon. A plurality of predetermined markers 410 may be arranged on the turntable 406. The markers 410 can be used to adjust the orientation and position of the model subjected to image capturing.

In FIG. 4, the model is placed on a translucent (transparent) stand; however, other support devices, such as an "action base", may be used. An action base is equipped with a support pillar and a mount, and the support pillar is configured to be bendable in the shape of a dogleg on top of the mount. A model can be attached to the end of the support pillar. In this case, a marker 410 among the markers 410 described above may be arranged at the end portion of the support pillar. The method of directing the model can be changed in accordance with the pose. For example, in the case of an upright posture, the model can be placed on the transparent stand, and image capturing can be performed. In contrast, in a case where even images of the soles of the feet of the model as in a flying posture are desired to be captured, an action base may be used. Note that an action base may be used to capture images of the model in an upright posture.

A display device 407 corresponds to the display device 140 and may have touch screen functionality. The user can perform specified selection actions using the touch screen functionality. A VR headset 408 includes an HMD 408A and a controller 408B, which correspond to the HMD 150A and the controller 150B, respectively. The user can wear the HMD 408A on their head and hold the controller 408B in the left and right hands to operate while viewing a VR video.

Figure 5:
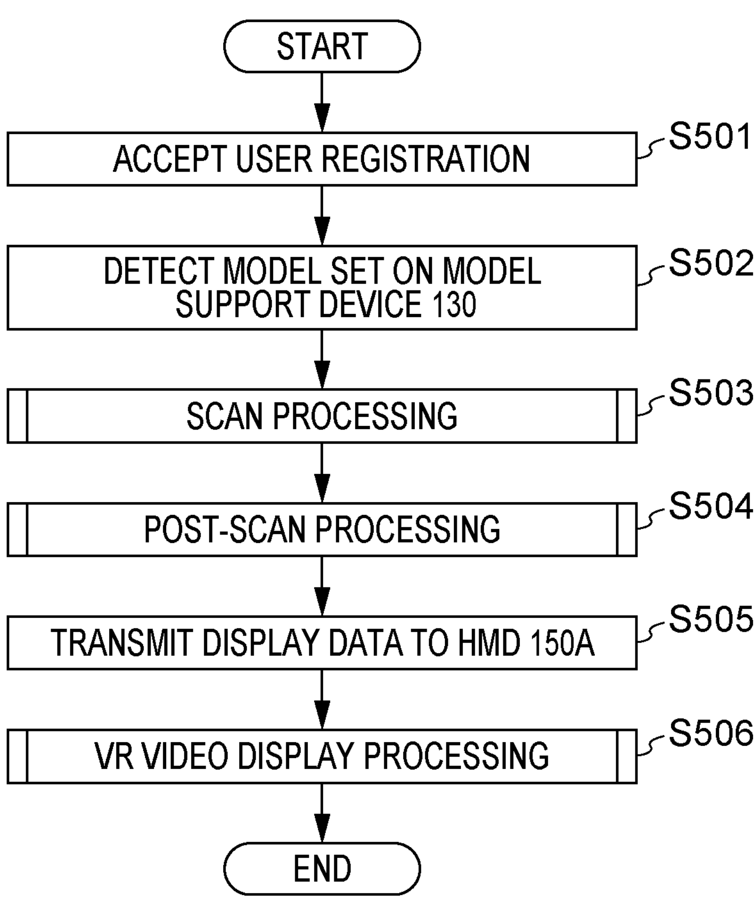
FIG. 5 is a flowchart corresponding to an example of processing in the image processing system corresponding to the embodiment.

Next, an example of processing performed by the image processing system 10 corresponding to the present embodiment will be described with reference to FIG. 5. At least part of the processing corresponding to this flowchart is achieved by the CPU 101 of the information processing apparatus 100 executing a program stored in the ROM 103 or the storage device 104 or by the CPU 151 of the headset 150 executing a program stored in the ROM 153 or the storage device 154.

First, in S501, the CPU 101 accepts user registration. Inputs such as the user's name and contact address are accepted. To each user, a user identifier for uniquely identifying the user is assigned. The CPU 101 stores, in the storage device 104, the input user information in association with the time of accepting the inputs and the user identifier.

When user registration is complete, the user sets their model on the model support device 130. In this case, in a case where the model can be separated into a plurality of constituent elements as in the case of the diorama model 300, each constituent element is set on the model support device 130. The CPU 101 can determine, on the basis of a scanned image from the scanner 110, whether a model has been set on the model support device 130. Alternatively, a switch that turns on when a model is set on the model support device 130 may be arranged, and the CPU 101 may detect and determine the signal from the switch. Alternatively, a button for accepting an operation when the process of setting a model is completed is displayed on the display unit 140, and the CPU 101 can detect whether an operation for operating the button has been accepted. In S502, the CPU 101 detects the model set on the model support device 130 using one of the methods described above. In response to the detection, the process proceeds to S503.

In S503, the scanner 110 performs scan processing (image capturing processing) to generate scanned images. The generated scanned images are transmitted to the information processing apparatus 100, and the CPU 101 stores, in a table in the storage device 104, the scanned images in association with the user identifier and the like. Next, in S504, the CPU 101 performs post-scan processing on the scanned images obtained through scan processing, generates three-dimensional model data, and generates application data (display data) for VR video display. When the application data is processed by a specific application, a VR video can be played back. The generated three-dimensional model data and display data are stored in the storage device 104 in association with the user information. Next, in S505, the CPU 101 transmits the application data to the HMD 150A by controlling the communication device 105. Next, in S506, the CPU 151 of the HMD 150A performs processing for displaying a VR video by executing the corresponding application using the received application data.

Figure 6:
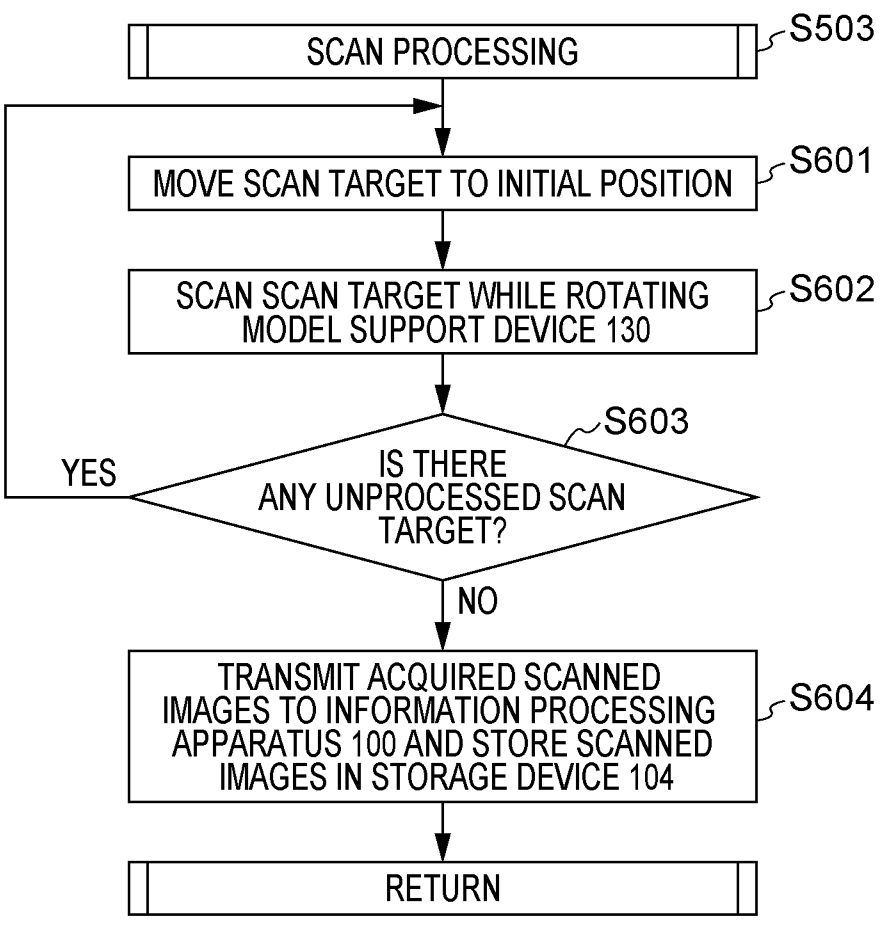
FIG. 6 is a flowchart corresponding to an example of scan processing corresponding to the embodiment.

Next, the scan processing in S503 will be described in detail with reference to FIG. 6. In the present embodiment, the driving information regarding the support arm 120 and the number of times the scanner 110 captures images at each image capturing position are registered for the image capturing position. When image capturing is performed at each image capturing position, image capturing can be performed by rotating the model support device 130.

First, in S601, the CPU 101 controls the support arm 120 to move the scanner 110 to one of the registered image capturing positions. Alternatively, the scanner 110 may be moved to one of the registered image capturing positions by manually controlling the support arm 120. Moreover, the model support device 130 is controlled to move to a rotation start position. In this case, a model serving as an image capturing target is oriented such that the front of the model faces the scanner 110. This is performed to start scanning from the front side of the model. Next, in S602, the CPU 101 can acquire scanned images of the model serving as the image capturing target as a result of the scanner 110 performing scanning while the CPU 101 rotates the model support device 130 at the image capturing position. The scanner 110 starts scanning from the front side of the model, and the front side of the model corresponds to the front side of the scan data. The scanner 110 can be a dedicated scanner device such as the Space Spider manufactured by Artec 3D and described above, or a general-purpose device with scanner functions such as a smartphone, a tablet device, or a digital camera. In scanning, switching may be performed between a dedicated scanner device and a general-purpose device depending on the nature of the portion of the model. For example, since a dedicated scanner device needs to be in close proximity to a target object to scan the target object, in a case where areas that are difficult to approach or intricate due to the structure of the target object are to be scanned, a general-purpose device may be used instead of the dedicated scanner device. The scanned images acquired by the respective devices can be combined in post-scan processing.

In this case, the model support system 130 may be stopped at a specific rotational position, and the model may be scanned while moving the scanner 110 vertically by controlling the support arm 120 or by a photographer manually changing the angle of the scanner 110. This allows images of the model to be captured from above or even from below. In particular, scanning from below makes it possible to scan even the soles of the model's feet. In this manner, scanning is performed such that the scan direction and angle are selected so as to cover the entire surface of the model in the present embodiment.

In the present embodiment, the model can be set on the transparent support rod extending from the model support device 130 so as to keep the model elevated and be scanned. Alternatively, the model can be made to stand upright directly on the turntable of the model support device 130 and be scanned. In the former case, images of the soles of the model's feet can also be captured, and thus this case is suitable for capturing images of the model set in the flying posture. In contrast, in the latter case, although images of the soles of the model's feet cannot be captured, this case is suitable for capturing images of the model set in the upright posture. Note that images of the model set in the upright posture may be captured in the former case.

Next, in S603, the CPU 101 determines whether there is an unprocessed scan target. As described above, there may be a case where the diorama model 300 is separated into its constituent elements, and scanning is performed. Thus, in a case where there is an unprocessed constituent element, the process returns to S601 to repeat processing. In contrast, in a case where there is not an unprocessed scan target, the process proceeds to S604. In S604, the scanner 110 transmits the scanned images acquired in this manner to the information processing apparatus 100, and the CPU 101 stores, in the storage device 104, the received images in association with the user information and the like.

Figure 7:
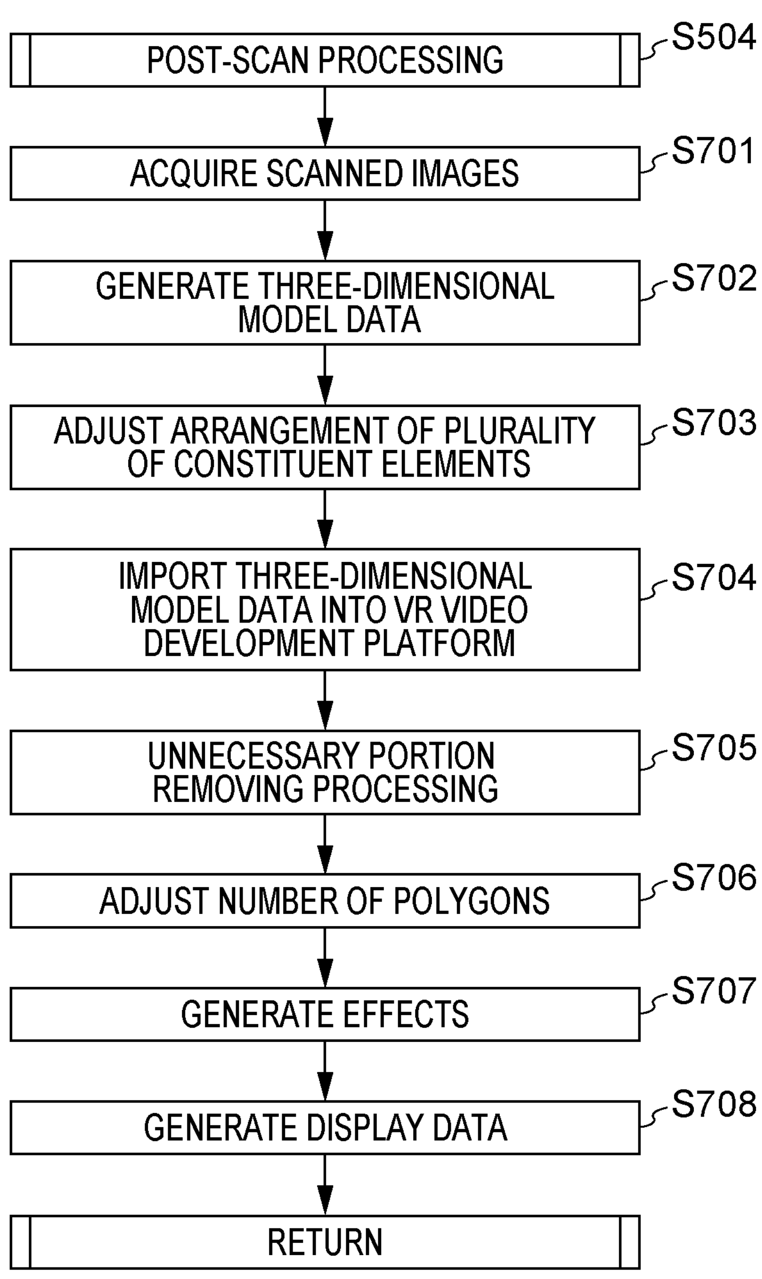
FIG. 7 is a flowchart corresponding to an example of post-scan processing corresponding to the embodiment.

Next, as post-scan processing in S504, processing for generating display data on the basis of the scanned images acquired in S503 will be described in detail with reference to FIG. 7. First, in S701, the CPU 101 acquires a plurality of scanned images stored in the storage device 104. Next, in S702, the CPU 101 generates, from the acquired scanned images, three-dimensional model data of the model, which serves as the original data, using a polygon mesh. The amount of information regarding the scanned images expressed in free-form curves is enormous when the information regarding the scanned images is used as is. Thus, the amount of data can be reduced by meshing the scanned images. In addition to removing noise, the number of polygons may be adjusted and bone structures may be added to movable portions during generation of the three-dimensional model data.

Next, in S703, in a case where the model has a plurality of constituent elements, arrangement adjustment processing for combining a plurality of three-dimensional model data into single three-dimensional model data is performed. The model may be a humanoid model or a diorama model. In order to acquire scanned images, in a case where the model can be separated into a plurality of constituent elements, the model is separated, and scan processing is performed. The plurality of scan data are combined in this step. In a case where the model is composed of a plurality of constituent elements as in the case of the diorama model 300, it is difficult to acquire perfect three-dimensional model data of each constituent element without separating the model. Thus, three-dimensional model data is acquired for each constituent element, and thereafter the acquired three-dimensional model data are combined. In aligning or adjusting the arrangement of the acquired three-dimensional model data at the time of combining, the relative position of each constituent element can be determined in accordance with the positional relationship between the constituent elements identified on the basis of the images of the diorama model 300 captured from a plurality of directions. In addition, in a case where a plurality of humanoid toys are included, the arrangement and orientation of each humanoid toy can be adjusted.

Next, in S704, the CPU 101 imports the three-dimensional model data, which is single data obtained by combining the three-dimensional model data in S703, into the VR video development platform, and arranges the three-dimensional model data within a predetermined virtual space constructed for a VR video. In this case, the VR image development platform can be, for example, UNITY, a game development platform provided by Unity Technologies.

Next, in S705, predetermined portions are eliminated from the three-dimensional model data imported in S704 in the VR video development platform. For example, the mount on which the model is arranged, the support member for supporting the constituent elements of the model, and members that are staged as effects by computer graphics (CG) or other digital representations (for example, beam representations and explosion representations) are removed. The predetermined portions may be removed on the basis of, for example, a comparison with a template prepared in advance. For example, regarding the support member, the support member is generally arranged directly from the mount or base member to each constituent element. Thus, a linear member extending from the mount to the constituent element can be eliminated. In contrast, linear members that extend from the mount to the constituent element but are not connected to the constituent element may be excluded from elimination targets. An elimination target member may be identified, and thereafter a member to be actually eliminated may be determined by accepting a release operation from the user. Furthermore, specification of additional elimination ranges may be accepted from the user, and the specified areas may further be included in the elimination targets.

Next, in S706, for each constituent element for which unnecessary portions and the like have been eliminated in S705, processing for adjusting the number of polygons is performed on a constituent element basis. For example, in the diorama model 300 illustrated in FIG. 3, an observer's attention is focused mainly on the humanoid model 301 and the floating part 303, while the base member 302 does not attract as much attention as the humanoid model 301. In such a case, a larger number of polygons is assigned to the humanoid model 301 and the floating part 303, and the number of polygons assigned to the base member 302 is reduced. By reducing the number of polygons in this manner, the computational load for display can be reduced. Regarding the humanoid model 301 and the floating part 303, the number of polygons may be different between the front-facing portion and the back-facing portion, and a larger number of polygons may be assigned to the front side. In addition, the number of polygons may be reduced or polygons may be painted black for portions that are not visible to the user in the final display data to be provided to the user. Regarding the base member 302, instead of uniformly reducing the number of polygons, a larger number of polygons may be assigned to the front side than to the back side. This reduces the number of polygons for less conspicuous portions while avoiding a decrease in the number of polygons for more conspicuous portions, thereby reducing the total number of polygons while maintaining display quality. Note that the front side and back side of the model can be defined, for example, as a side including a scan starting point and a side including a position on the opposite side from the scan starting point, respectively. Thus, in the processing in S503, scanning is started from the position corresponding to the front side of the model.

Next, in S707, effects are generated. Effects may be added to supplement at least some of the unnecessary portions eliminated in S705. For example, in the diorama model 300 in FIG. 3, the beam 304 is emitted from a beam rifle held by the humanoid model 301, and there is an expression of the beam 304 piercing through the floating part 303. Since this beam 304 is eliminated in S705, an animation is generated to add an effect that supplements this eliminated constituent element. In a case where the model, an image capturing target, includes an explosion expression or the like, this can also be excluded and instead be supplemented by an animation. In contrast, the support member 305 for supporting a constituent element such as the floating part 303 in FIG. 3 is another constituent element eliminated in the same manner but is unnecessary in the expression of the VR video. Thus, no effect is added to supplement this portion. In the case of the model 200, which is a single model, an animation of an effect for an expression of exhaust air from the model can be generated. In addition, any animation that achieves a certain effect can be generated and superimposed on the three-dimensional model data. Furthermore, in a case where a bone structure is added to a movable portion in S702, an effect that moves part of the model using the bone structure can be added. For example, in a case where a flag is included in the model, the bone structure embedded in the flag can be used to represent the flag waving in the wind as an effect.

Next, in S708, display data capable of displaying a VR video is generated by performing processing on the VR video development platform on the basis of the data generated in the above-described steps.

Figure 8:
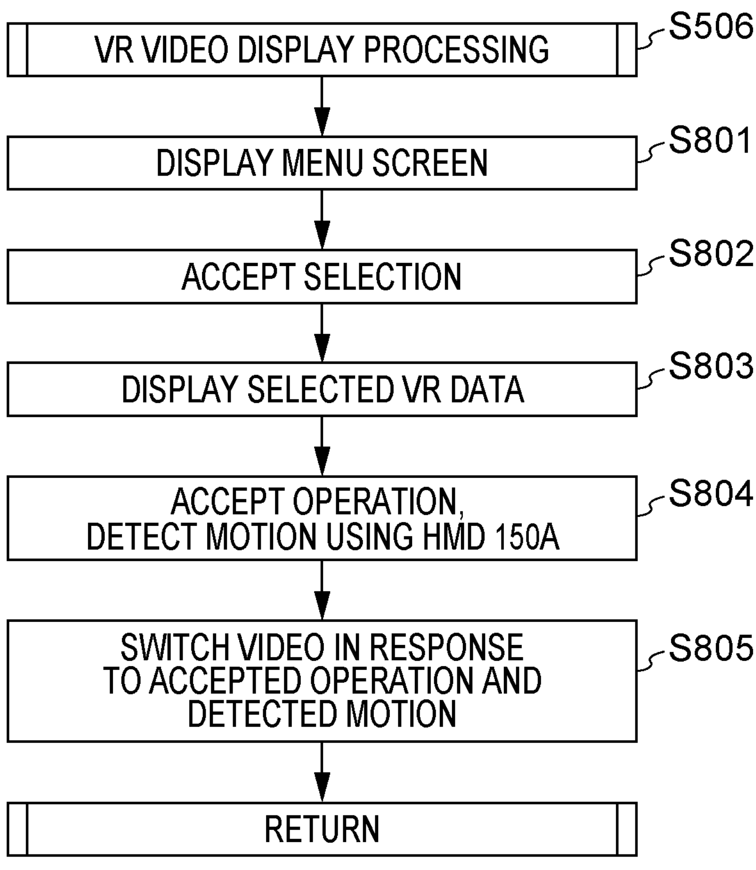
FIG. 8 is a flowchart corresponding to an example of VR video display processing corresponding to the embodiment.

FIG. 8 describes display-data display processing corresponding to S506. The processing in FIG. 8 is performed by the CPU 151 of the HMD 150A. In the HMD 150A, an application for displaying a VR video has been installed, the VR video being compatible with the VR image development platform used to generate VR data in the information processing unit 100. The CPU 151 can display the VR video on the display 156 by executing the application using the display data.

First, in S801, the CPU 151 causes the display 156 of the HMD 150A to display the menu screen of the VR video that can be provided. On the menu screen, the user can make and input a selection using the controller 150B. In this case, a plurality of icons are displayed on the menu screen. Each icon indicates a starting point of the VR video, and the user can view the VR video from one of the plurality of starting points in accordance with the selected icon. The individual starting points correspond to a plurality of viewpoint positions from which the diorama model 300, which is a scan target, can be viewed.

In the VR video, the user can move through the virtual space where the three-dimensional model data of the model is arranged, either according to a predetermined route or freely, and a corresponding walk-through video is provided to the user via the HMD 150A.

Next, in a case where the CPU 151 accepts a selection operation made by the user using the controller 150B in S802, the CPU 151 causes the display 156 to display the VR video from the starting position corresponding to the selected icon in S803. Next, in S804, the CPU 151 acquires information regarding an operation performed on the controller 150B by the user and the detection information detected at the detector 157 in the HMD 150A.

Next, in S805, the CPU 151 performs control to switch the video displayed on the display 156, on the basis of the operation information and the detection information acquired in S804. For example, in a case where a zoom-in operation is performed based on the operation information, the application generates a video to update the video displayed on the display 156 so as to enlarge and display the video displayed on the display 156. Moreover, in a case where the detection information indicates that the user is facing up, down, left, or right, the application generates a video to update the video displayed on the display 156 so as to switch to the corresponding direction.

The user can zoom in and out of the screen, change the line-of-sight direction, change the user's position in the virtual space, display menu screens, select menus, and so forth via the controller 150B. In a case where the user moves in the real space, such as by walking, the detector 157 of the HMD 150A can detect the movement and change the position of the user in the virtual space. Moreover, in a case where the user changes the direction or angle of their face, the detector 157 can detect the change and switch to the VR video corresponding to the line-of-sight direction.

In the above description, the case where the VR video display processing in S506 is performed by the HMD 150A is described. However, embodiments of the invention are not limited to the form of display in the HMD 150A. Other than this, in accordance with the flowchart in FIG. 8, the VR video may be displayed using the display data on the display device 140 in the information processing apparatus 100, in which the VR video development platform is installed. In that case, equivalent operations can be accepted via the operation unit 140A instead of the controller 150B. Furthermore, similarly in accordance with the flowchart in FIG. 8, a VR video may be displayed using display data on a personal computer (PC), a smartphone, or a tablet terminal in which an application for displaying VR videos compatible with the VR image development platform has been installed. In that case, equivalent operations can be accepted via the keyboard or mouse of a PC or the touch panel of a smartphone or the like instead of the controller 150B. In this case, the PC, the smartphone, and the tablet terminal can download display data via wireless communication with the information processing apparatus 100.

Furthermore, a server may be connected to a PC, a smartphone, or a tablet terminal via a network, and the PC, the smartphone, or the tablet terminal may receive a VR video based on display data from the server, in which the VR video development platform is installed. In this case, the PC, the smartphone, or the tablet terminal can be connected to the server via a browser, and a VR video received from the server can be viewed using the browser. In this case, the VR video can be viewed as long as the browser is available even when a specific application is not installed in the PC, the smartphone, or the tablet terminal.

Figure 9A:
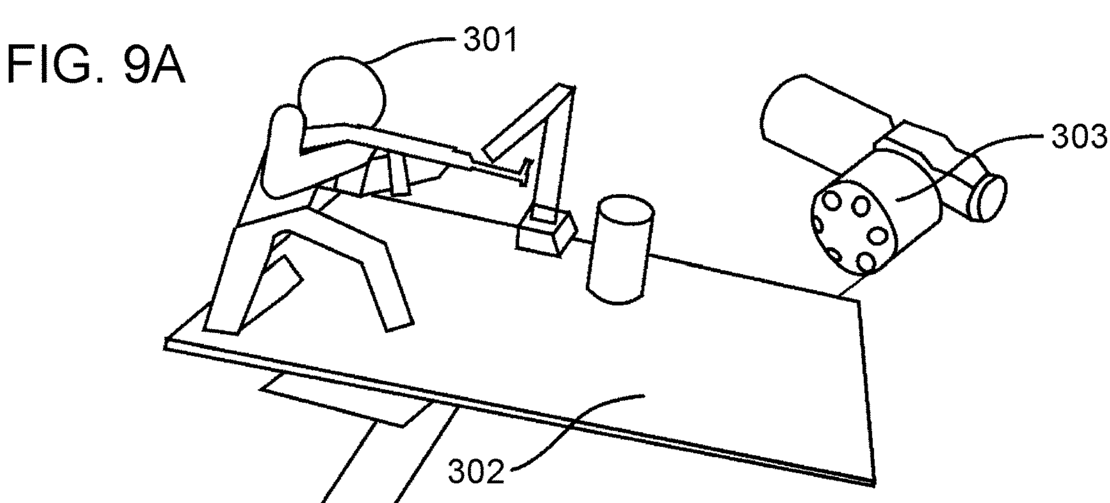
FIGS. 9A, 9B, and 9C are diagrams illustrating an example of an effect expression in a VR video corresponding to the embodiment.
Figure 9B:
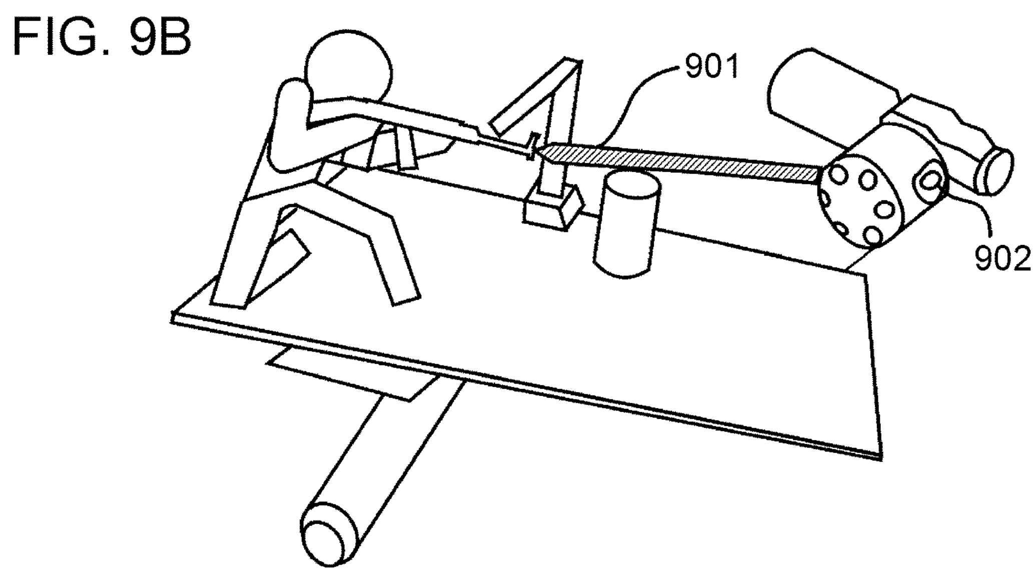
Figure 9C:
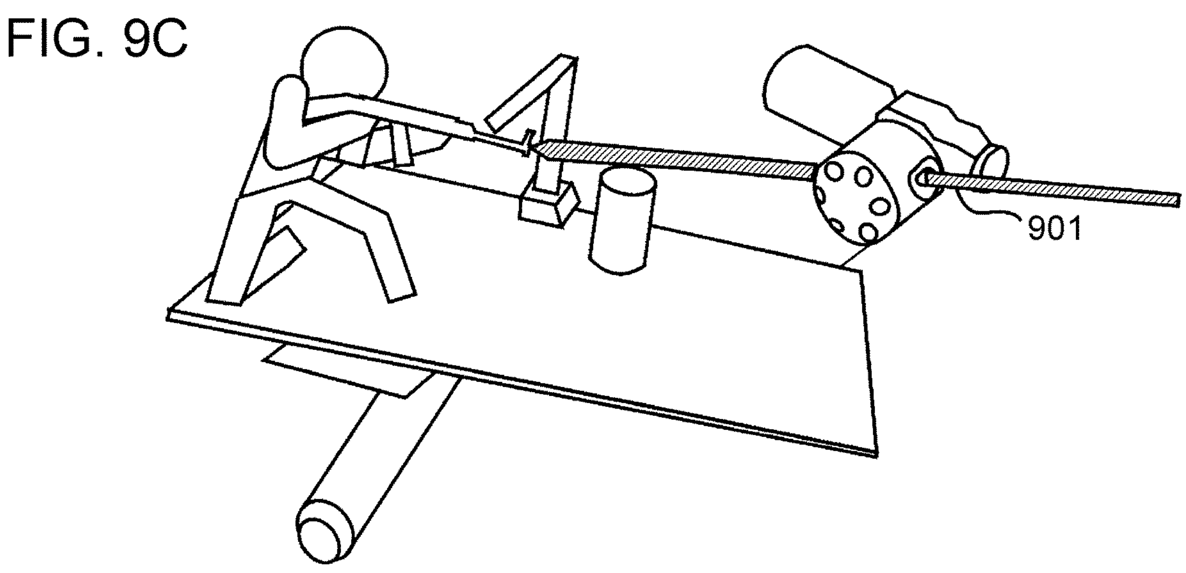

FIGS. 9A to 9C are diagrams illustrating an example of an effect expression in a VR video. FIG. 9A illustrates a video of the diorama model 300 illustrated in FIG. 3 before the effect expression begins. The example illustrated in FIG. 9A does not include the beam 304, the support member 305, and the mount 306, which are present in FIG. 3. These have already been removed in the process of generating display data.

Next, in FIG. 9B, the way in which the floating part 303 is irradiated with a beam 901 from the beam rifle held by the model 301 is displayed as an effect in an animated manner. FIG. 9B illustrates a state where the beam 901 is hitting the floating part 303; however, the way in which the beam 901 is moving away from the beam rifle is displayed in an animated manner in the VR video. Moreover, when the beam 901 penetrates through the floating part 303, an animation 902 that represents the way in which the surface of the floating part 303 is melting can be superimposed as an effect. Subsequently, FIG. 9C displays a state where the beam 901 has penetrated through and is moving away from the floating part 303. In the VR video provided through the HMD 150A, the state transitioning from FIG. 9A to FIG. 9C is repeated as an animation.

In this manner, the three-dimensional model data of the model is generated and incorporated into the VR video in the present embodiment, so that the model can be viewed in the VR video. In that case, the size of the model can be changed as desired within the VR video, so that the miniature-sized model is represented so as to be expanded in its true scale before the user's eyes, thereby significantly improving the sense of realism.

In the above-described embodiment, the case has been described in which the three-dimensional model data generated from the images obtained by performing image capturing on the model is arranged in the virtual space to generate the display data for displaying the VR video. However, the embodiment is not limited to generation of VR videos, and the three-dimensional model data can be used as game data for a virtual space. Moreover, the embodiment is also widely applicable to processing for operating a character in a virtual space. For example, it is possible to have the character appear at events, concerts, sports, online conferences, and so forth that take place in the virtual space. Furthermore, the technology of the present embodiment can also be applied in a video technology that merges the real world and virtual world, similar to Cross Reality (XR), enabling the perception of things that do not exist in physical space.

In this manner, in the present embodiment, three-dimensional model data is generated from images obtained by capturing the exterior of a model, and the three-dimensional model can be viewed in a VR video. Some models, such as those built from plastic model kits, are for example painted and finished as unique creations by the user, and the individuality of the models can be reflected as character representations in a video or in a virtual space, so that preference can be significantly improved.

Summary of Embodiments

The above-described embodiments disclose at least the following image processing method, information processing apparatus, and computer program.

(1) An image processing method for generating display data for displaying a virtual reality (VR) video on an external display device, the image processing method including:

generating, using a processing unit, first three-dimensional model data of a model from a plurality of scanned images generated by scanning an exterior of the model from a plurality of directions using a scanner unit;

processing the first three-dimensional model data using the processing unit;

adding an effect to the processed first three-dimensional model data using the processing unit; and generating display data including the first three-dimensional model data to which the effect is added.

(2) In the image processing method described in (1), the model includes a plurality of constituent elements, the first three-dimensional model data includes a plurality of second three-dimensional model data corresponding to the plurality of constituent elements, and the generating the first three-dimensional model data of the model includes adjusting arrangement of the plurality of second three-dimensional model data.

(3) In the image processing method described in (2), the processing includes adjusting a number of polygons for the first three-dimensional model data using the processing unit, and in the adjusting, a number of polygons is adjusted for each of the plurality of second three-dimensional model data.

(4) In the image processing method described in (3), in the adjusting, a different number of polygons is assigned to each of the plurality of second three-dimensional model data in accordance with a certain orientation.

(5) In the image processing method described in (4), in the adjusting, a larger number of polygons is assigned to a front side of the second three-dimensional model data.

(6) In the image processing method described in any one of (3) to (5), the model is a diorama model that includes at least a humanoid model and a base member and in which the humanoid model is arranged on the base member.

(7) In the image processing method described in (6), in the adjusting, a larger number of polygons is assigned to the humanoid model than to the base member.

(8) In the image processing method described in any one of (1) to (7), the processing includes eliminating a portion of the first three-dimensional model data corresponding to the exterior of the model, the portion being unnecessary in a VR video, and in the adding, an effect that supplements at least part of the portion eliminated in the eliminating is added.

(9) In the image processing method described in (8), the unnecessary portion includes a support member for supporting the model, and in the adding, an effect that supplements the eliminated portion excluding the support member is added.

(10) In the image processing method described in (8), the adding includes adding an effect in an animated representation.

(11) In the image processing method described in any one of (1) to (10), the external display device is a head-mounted display device, and a predetermined application is installed in the head-mounted display device, the display data is data to be processed by the predetermined application to display a VR video on the head-mounted display device.

(12) An information processing apparatus that generates display data for displaying a virtual reality (VR) video on an external display device, the information processing apparatus including:

a first generation unit that generates first three-dimensional model data of a model from a plurality of scanned images generated by scanning an exterior of the model from a plurality of directions using a scanner unit;

a processing unit that processes the first three-dimensional model data;

an addition unit that adds an effect to the processed first three-dimensional model data; and a second generation unit that generates display data including the first three-dimensional model data to which the effect is added.

(13) A computer program causing a computer to execute: the image processing method described in any one of (1) to (11).

The invention is not limited to the embodiments described above, and various modifications and changes are possible within the scope of the gist of the invention.

What is claimed is:

1. An image processing method for generating display data for displaying a virtual reality (VR) video on an external display device, the image processing method comprising:

generating, using a processor, first three-dimensional model data of a model using a polygon mesh having a plurality of polygons, from a plurality of scanned images acquired by scanning an exterior of the model from a plurality of directions using a scanner;

processing the first three-dimensional model data using the processor, including eliminating a portion of the first three-dimensional model data corresponding to the exterior of the model;

adding an effect to the processed first three-dimensional model data using the processor, including adding an effect that supplements at least a part of the eliminated portion; and generating display data including the first three-dimensional model data to which the effect is added.

2. The image processing method according to claim 1, wherein the model includes a plurality of constituent elements, the first three-dimensional model data includes a plurality of second three-dimensional model data corresponding to the plurality of constituent elements, and the generating the first three-dimensional model data of the model includes adjusting arrangement of the plurality of second three-dimensional model data.

3. The image processing method according to claim 2, wherein the processing includes adjusting a total number of the plurality of polygons in the polygon mesh for the first three-dimensional model data using the processor, including adjusting the total number of the plurality of polygons for each of the plurality of second three-dimensional model data.

4. The image processing method according to claim 3, wherein the adjusting the total number includes assigning a different total number to each of the plurality of second three-dimensional model data in accordance with an orientation.

5. The image processing method according to claim 4, wherein the adjusting the total number includes assigning a larger total number to a front side of the second three-dimensional model data.

6. The image processing method according to claim 3, wherein the model is a diorama model that includes at least a humanoid model and a base member and in which the humanoid model is arranged on the base member.

7. The image processing method according to claim 6, wherein the adjusting the total number includes assigning a larger number of polygons is to the humanoid model than to the base member.

8. The image processing method according to claim 1, wherein the eliminated portion includes a support member for supporting the model, and in the adding, an effect that supplements the eliminated portion excluding the support member is added.

9. The image processing method according to claim 1, wherein the adding includes adding an effect in an animated representation.

10. The image processing method according to claim 1, wherein the external display device is a head-mounted display device, and a predetermined application is installed in the head-mounted display device, the display data being data to be processed by the predetermined application to display a VR video on the head-mounted display device.

11. An information processing apparatus that generates display data for displaying a virtual reality (VR) video on an external display device, the information processing apparatus comprising:

a processor; and a non-transitory storage medium having program instructions stored thereon, execution of the program instructions by the processor causing the information processing apparatus to provide functions of:

a first generation unit that generates first three-dimensional model data of a model using a polygon mesh having a plurality of polygons, from a plurality of scanned images acquired by scanning an exterior of the model from a plurality of directions using a scanner unit;

a processing unit that processes the first three-dimensional model data, including eliminating a portion of the first three-dimensional model data corresponding to the exterior of the model;

an addition unit that adds an effect to the processed first three-dimensional model data, including adding an effect that supplements at least a part of the eliminated portion; and a second generation unit that generates display data including the first three-dimensional model data to which the effect is added.

12. A non-transitory computer readable medium storing a program causing a computer to execute the image processing method according to claim 1.

* * * * *